United States Patent
Lantrip et al.

(10) Patent No.: US 6,298,174 B1
(45) Date of Patent: Oct. 2, 2001

(54) THREE-DIMENSIONAL DISPLAY OF DOCUMENT SET

(75) Inventors: David B. Lantrip, Oxnard, CA (US);
Kelly A. Pennock, Richland, WA (US);
Marc C. Pottier, Richland, WA (US);
Anne Schur, Richland, WA (US);
James J. Thomas, Richland, WA (US);
James A. Wise, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/419,724

(22) Filed: Oct. 15, 1999

Related U.S. Application Data

(63) Continuation of application No. 09/235,463, filed on Jan. 22, 1999, now abandoned, which is a continuation of application No. 08/695,455, filed on Aug. 12, 1996, now abandoned.

(51) Int. Cl.$^7$ ............................. G06K 9/60; G06F 17/30; H04N 1/00
(52) U.S. Cl. ............................. 382/305; 707/1; 358/403
(58) Field of Search .................................. 382/306, 305, 382/309, 307, 185; 707/530, 531–538, 2–6, 1, 102, 100; 358/403

(56) References Cited

U.S. PATENT DOCUMENTS

| | | | |
|---|---|---|---|
| 5,301,105 | * | 4/1994 | Cummings, Jr. ..................... 364/401 |
| 5,317,507 | * | 5/1994 | Gallant ............................ 364/419.13 |
| 5,619,709 | * | 4/1997 | Caid et al. ............................ 395/794 |

\* cited by examiner

*Primary Examiner*—Jose L. Couso
*Assistant Examiner*—Duy M. Dang
(74) *Attorney, Agent, or Firm*—Sterne, Kessler, Goldstein & Fox P.L.L.C.

(57) ABSTRACT

A method for spatializing text content for enhanced visual browsing and analysis. The invention is applied to large text document corpora such as digital libraries, regulations and procedures, archived reports, and the like. The text content from these sources may be transformed to a spatial representation that preserves informational characteristics from the documents. The three-dimensional representation may then be visually browsed and analyzed in ways that avoid language processing and that reduce the analysts' effort.

1 Claim, 4 Drawing Sheets

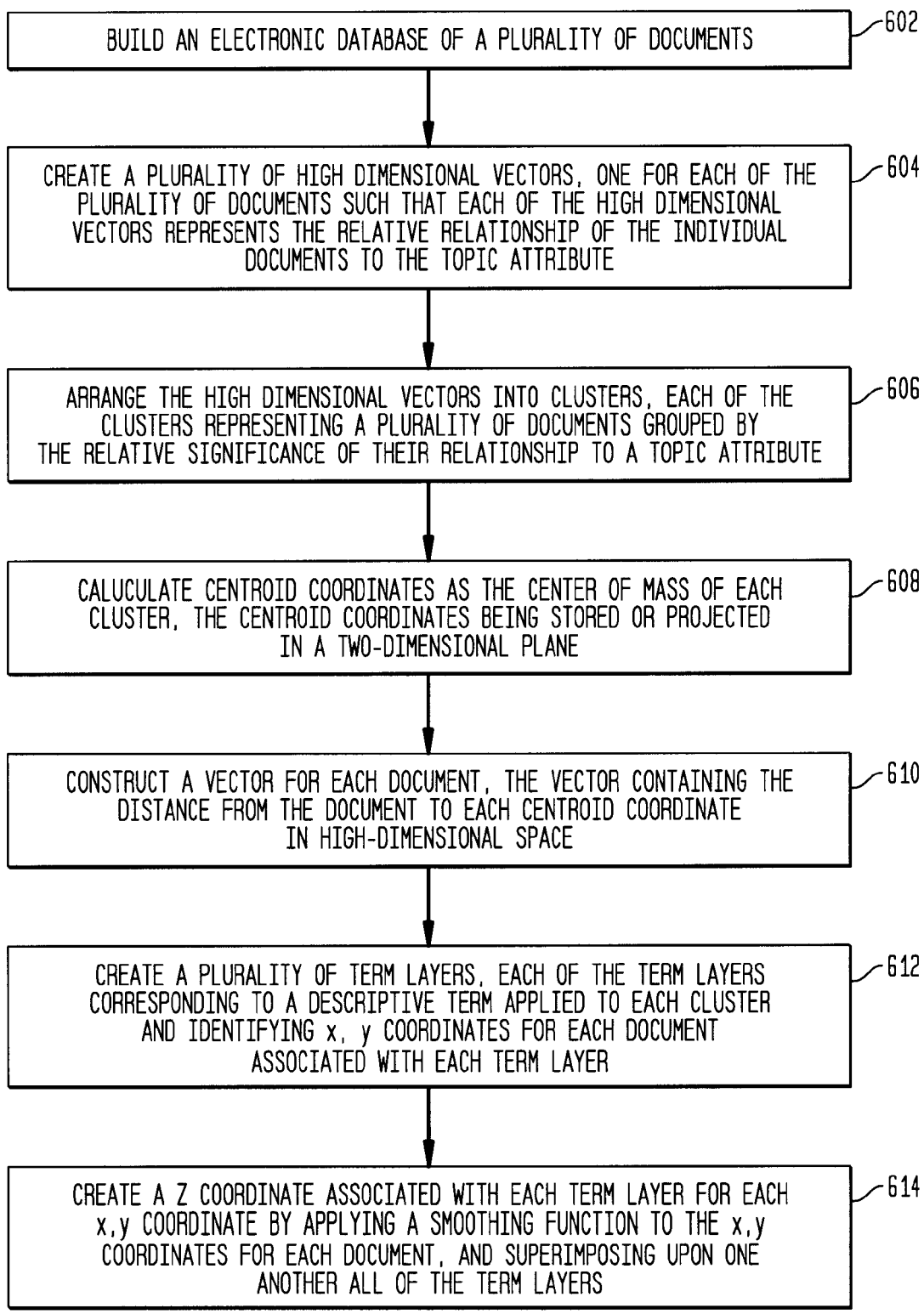

THREE-DIMENSIONAL DISPLAY OF DOCUMENT SET

REFERENCE TO RELATED APPLICATION

This application is a continuation of application Ser. No. 09/235,463 filed on Jan. 22, 1999, now abandoned which is a continuation of application Ser. No. 08/695,455 filed on Aug. 12, 1996, now abandoned and which are hereby incorporated by reference in their entirety.

This invention was made with Government support under Contract DE-AC06 76RLO 1830 awarded by the U.S. Department of Energy. The Government has certain rights in the invention.

FIELD OF THE INVENTION

This invention relates generally to the field of information storage and retrieval, or "information visualization". More particularly, the invention relates to a novel method for text-based information retrieval and analysis through the creation of a visual representation for complex, symbolic information. This invention also relates to a method of stored information analysis that (i) requires no human pre-structuring of the problem (ii) is subject to independent, (iii) is adaptable to multi-media information, and (iv) is constructed on a framework of visual presentation and human interaction.

DESCRIPTION OF THE PRIOR ART

Current visualization approaches demonstrate effective methods for visualizing mostly structured and/or hierarchical information such as organization charts, directories, entity-attribute relationships, and the like. Mechanisms to permit free text visualizations have not yet been perfected. The idea that open text fields themselves or raw prose might be candidates for information visualization is novel. The need to read and assess large amounts of text that is retrieved through graph theory or figural displays as "visual query" tools on document bases puts severe limits on the amount of text information that can be processed by any analyst for any purpose. At the same time, the amount of "open source" digital information is increasing exponentially. Whether it be for market analysis, global environmental assessment, international law enforcement or intelligence for national security, the analyst task is to peruse large amounts of data to detect and recognize informational 'patterns' and pattern irregularities across the various sources.

True text visualizations that would overcome these time and attentional constraints must represent textual content and meaning to the analyst without them having to read it in the manner that text normally requires. These visualizations would instead result from a content abstraction and spatialization of the original text document that would transform it into a new visual representation conveying information by image instead of prose.

Prior researchers have attempted to create systems for analysis of large text-based information data bases. Such systems have been built on Boolean queries, document lists and time consuming human involvement in sorting, editing and structuring. The simplification of Boolean function expressions is a particularly well-known example of prior systems. For example, in U.S. Pat. No. 5,465,308, a method and apparatus for pattern recognition utilizes a neural network to recognize two dimensional input images which are sufficiently similar to a database of previously stored two dimensional images. Images are first image processed and subjected to a Fourier transform which yields a power spectrum. An in-class to out-of-class study is performed on a typical collection of images in order to determine the most discriminatory regions of the Fourier transform. Feature vectors are input to a neural network, and a query feature vector is applied to the neural network to result in an output vector, which is subjected to statistical analysis to determine if a sufficiently high confidence level exists to indicate that a successful identification has been made.

SUMMARY OF THE INVENTION

The SPIRE (Spatial Paradigm for Information Retrieval and Exploration) software supports text-based information retrieval and analysis through the creation of a visual representation for complex, symbolic information. A primary goal of SPIRE is to provide a fundamentally new visual method for the analysis of large quantities of information. This method of analysis involves information retrieval, characterization and examination, accomplished without human pre-structuring of the problem or pre-sorting of the information to be analyzed. The process produces a visual representation of results.

More specifically, the novel process provides a method of determining and displaying the relative content and context of a number of related documents in a large document set. The relationships of a plurality of documents are presented in a three-dimensional landscape with the relative size and height of a peak in the three-dimensional landscape representing the relative significance of the relationship of a topic, or term, and the individual document in the document set. The steps of the process are:

(a) constructing an electronic database of a plurality of documents to be analyzed;

(b) creating a plurality of high dimensional vectors, one for each of the plurality of documents, such that each of the high dimensional vectors represents the relative relationship of the individual documents to the term, or topic attribute;

(c) arranging the high dimensional vectors into clusters, with each of the clusters representing a plurality of documents grouped by relative significance of their relationship to a topic attribute;

(d) calculating centroid coordinates as the center of mass of each cluster, the centroid coordinates being stored or projected in a two-dimensional plane;

(e) constructing a vector for each document, with each vector containing the distance from the document to each centroid coordinate in high-dimensional space;

(f) creating a plurality of term (or topic) layers, each of the term layers corresponding to a descriptive term (or topic) applied to each cluster, and identifying x,y coordinates for each document associated with each term layer; and (g) creating a z coordinate associated with each term layer for each x,y coordinate by applying a smoothing function to the x,y coordinates for each document, and superimposing upon one another all of the term layers.

BRIEF DESCRIPTION OF THE DRAWINGS

The accompanying drawings, which are incorporated in and constitute a part of the specification, illustrate preferred embodiments of the invention, and together with the description, serve to explain the principles of the invention.

FIG. 6 is a block diagram presenting the sequence step in the preferred embodiment of the present invention.

DETAILED DESCRIPTION OF THE INVENTION

Figure 1:
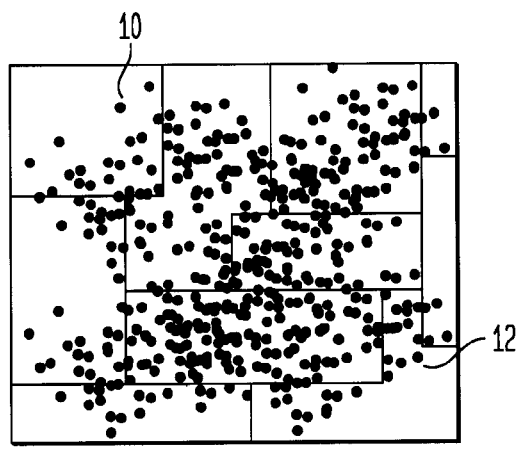
FIG. 1 is a graphical representation of database relationships in two-dimensional space.

As used herein, the following terms shall have the following definitions:

1. Information Retrieval means access and discovery of stored information. It requires the efficient retrieval of relevant information from ill-structured natural language-based documents. The effectiveness of a retrieval method is measured by both precision, or the proportion of relevant to non-relevant documents identified, and recall, or the percentage of relevant documents identified.

2. Information analysis is discovery and synthesis of stored information. It involves the detection of information patterns and trends and the construction of inferences concerning these patterns and trends which produce knowledge.

The present invention is known as SPIRE (Spatial Paradigm for Information Retrieval and Exploration). SPIRE is a method of presenting information by relative relationships of content and context—that is, the "relatedness" of a plurality of documents to one another both by their sheer numbers and by their subject matter. It is comprised of a plurality of elements which define it's usefulness as an information analysis tool. Briefly, the elements are: a combination of an intuitive and attractive interface, well integrated with a powerful set of analytical tools; a computationally efficient approach to both clustering and projection, essential for large document sets; a three-dimensional visualization component to render stored information in a three-dimensional format (known as ThemeScapes); and a unique interplay between the 2-dimensional and 3-dimensional visualization components.

An essential first step in the transformation of natural language text to a visual form is to extract and structure information about the text—through a "text processing engine". A text processing engine for information visualization requires: (1) the identification and extraction of essential descriptors or text features, (2) the efficient and flexible representation of documents in terms of these text features, and (3) subsequent support for information retrieval and visualization. There are a number of acceptable text engines currently available on the market or as research prototypes, such as the Hecht Nielson Corporation's MatchPlus or the National Security Agency's Acquaintance.

The parameters typically measured by a text engine fall into one of three general types. First, 'frequency-based measures' on words, utilizing only first order statistics. The presence and count of unique words in a document identifies those words as a feature set. The second type of feature is based on higher order statistics taken on the words or letter strings. Here, the occurrence, frequency, and context of individual words are used to characterize a set of explicit or implicitly defined word classes. The third type of text feature is semantic—the association between words is not defined through analysis of the word corpus, as with statistical features, but is defined a priori using knowledge of the language. Semantic approaches may utilize natural or quasi-natural language understanding algorithms.

The second requirement of the text engine (efficient and flexible representation of textual information) is satisfied if identified text features are used as a shorthand representation of the original document. Instead of complex and unwieldy strings of words, feature sets are the basis of document representation. Volume reduction of information is required to make later computations possible Finally, the text engine must provide easy, intuitive access to the information contained within the corpus of documents through retrieval and visualization. To provide efficient retrieval, the text processing engine must pre-process documents and efficiently implement an indexing scheme for individual words or letter strings. Information retrieval implies a query mechanism to support it—often a basic Boolean search, or a high level query language, or the visual manipulation of spatialized text objects in a display.

The process of the present invention can best be described with reference to a five-stage text visualization process.

STAGE ONE The receipt of electronic versions of textual documents into the text engine described above is essentially independent of, but a required precursor for, the SPIRE process. The documents are input as unprocessed documents—no key wording, no topic extraction, no pre-defined structure is necessary. In fact, the algorithms used to create a spatial representation of the documents presupposes the characteristics of natural language communication so that highly structured information (e.g. tables and outlines) cannot be adequately processed and will result in diminished results.

STAGE TWO The analysis of natural language documents provides a characterization of the documents based on content. Performed in the text engine, the analysis can be first order (word counts and/or natural language understanding heuristics) or higher order information captured by Bayesian or neural nets. The required output is that each document must be converted to a high dimensional vector. A metric on the vector space, such as a Euclidean distance measure or cosine measure, can be used to determine the similarity of any two documents in the collection. The output of this processing stage is a high dimensional vector for each document in the collection.

STAGE THREE The document vectors must be grouped in the high dimensional metric space—"clustering". In order to satisfy performance requirements for large document sets, clustering algorithms with a lower order of complexity are essential. The output of this stage is a partition set on the document collection with measures for each cluster of magnitude (count) dispersion. While it is believed that there are a number of different approaches to the clustering of information that will lead to acceptable results, Applicants have determined to limit the document vectors to "large" (more than 3,000 documents) and "small" (less than 3,000 documents) data sets. For small data sets, readily available clustering algorithms have been used, with primary emphasis on k-means and complete linkage hierarchical clustering.

For larger data sets, traditional clustering algorithms can not be used because of the exponential complexity of the clustering algorithms as the data set increases. Applicants have therefore devised an alternative method for clustering in large problem sets known as "Fast Divisive Clustering". In this process, the user selects the desired number of clusters. No assistance is provided in selecting this number, but it should be heuristically based on knowledge of the data set, such as size, diversity, etc. After the number of seeds has been selected, the next step is to place seeds in the multi-dimensional document space. A sampling of the subspaces is performed to ensure that there is a reasonable distribution of the cluster seeds—that is, they are not too close to one another. Then, the hyperspheres are defined around each cluster seed and assigned to all documents within a hypersphere to the corresponding cluster. Iteratively, the center of mass is calculated yielding a new cluster centroid, and therefore a new location for the hypersphere and new document assignments. Within a few iterations, locations for the cluster centroids will be determined, and the final document to cluster assignments are made. Changes in distances between iterations should remain within a predefined threshold.

This third stage can be summarized as:

(i) selecting the number of seeds, based on characteristics of the document collection;

(ii) placing seeds in hyperspace by sampling regions to ensure reasonable distribution of seeds;

(iii) identifying non-overlapping hyperspheres (one for each cluster) and assigning each document to a cluster based on which hypersphere the document is located within;

(iv) calculating a centroid coordinate—the center of the mass for each cluster; and (v) repeating steps (iii) and (iv) until centroid movement is less than a prescribed threshold.

STAGE FOUR This stage requires the projection of the high dimensional document vectors and the cluster centroids produced in Stage 3 into a 2-dimensional representation (FIG. 1), The 2-D planar representation of the documents and clusters is necessary for user viewing and interaction. Because the number of dimensions is reduced from hundreds to two, a significant loss of information naturally results. Some representational anomalies are produced by projection, causing documents to be placed with an associated error. The nature and quantity of this error are defining characteristics of the chosen projection. As with the clustering stage, compute time is important for large document sets. Therefore, projection algorithms which are of a low order of complexity are vital. The product of this stage is a set of 2D coordinates, one coordinate pair (10,12) for each document.

As with the clustering of Stage three, multiple options for projection techniques are available. For relatively small data sets, Applicants have chosen to use "Multi-dimensional Scaling Algorithm", or MDS. The MDS utilized pairwise distances (Euclidean or cosine angle) between all document pairs. The algorithm attempts to reserve the distances determined in the high-dimensional space when projecting to 2D space. In doing so, the discrepancy between pairwise distances in the high dimensional space and the 2D counterparts are represented as an error measure. The algorithm iteratively adjusts document positions in the 2D plane in order to minimize the associated error. The distance from every point to every other point is considered and weighed against a preset desired distance. Every point influences every other point, making MDS a computationally intensive algorithm.

For larger data sets, MDS is impractical due to the exponential order of complexity, and Applicants have therefore developed a projection algorithm called "Anchored Least Stress". When starting with a fixed number of points (cluster centroids which have been calculated in stage three), the algorithm considers only the distance from a point to the various cluster centriods, not the distance to every other point. The document is placed so that its position reflects its similarity or dissimilarity to every cluster centroid. Only a relatively small amount of initial calculation is required; after that each document can be positioned using simple matrix operations, with a computational complexity on the order of the number of cluster centroids. With the centroids placed in the 2D plane, a vector is constructed for each document which contains the distances from the document to each cluster centroid in the high dimensional space. Given the vector of hyperspace distances, a closed form solution can be constructed which rapidly produces the 2D coordinates of each document in the document collection.

More specifically, if one begins with n cluster centroids cj (the 2-dimensional projection of the cluster centroids from high-dimensional space), assume the coordinate system is such that the center of mass of all the cluster centroids is at the origin. Let $$c_{\cdot 1} = \frac{1}{n}\sum_{j=1}^{n} c_{j1}; \quad c_{\cdot 2} = \frac{1}{n}\sum_{j=1}^{n} c_{j2} \qquad [1]$$

and then change the coordinates of the centroids as follows:

$$c_{j1}(new)=c_{j1}(old)-c_{\cdot 1}; \; c_{j2}(new)=c_{j2}(old)-c_{\cdot 2} \qquad [2]$$

The squared distance between each document i and each of the cluster centroids j (as measured in the original high-dimensional space) is $d_{ij}$. There are m documents with unknown 2-dimensional coordinates $x_i$. For each document i and cluster j, we desire to have $x_i$, such that $$d_{ij}=\|x_i-c_j\|^2 \qquad [3]$$

The average distance between the document and the centroids $$d_{i\cdot} = \frac{1}{n}\sum_{j=1}^{n} d_{ij} \qquad [4]$$

and $w_{ij}$ is the unknown quantity $$w_{ij}=x_i\cdot c_j=x_{i1}c_{j1}+x_{i2}c_{j2} \qquad [5]$$

If it is desired to force documents to be closer to the centroid of the cluster to which they belong, a weighted least squares approach may be utilized. Let $w_c$ be an input weight—this is interpreted as the distance of a point from its own cluster centroid and is $w_c$ times more important than its distance from any other cluster. A matrix $S_j$ is defined to have 0's on the off-diagonal and 1's on the diagonal, except for the (j,j) th entry, which is equal to $w_c$. The weighted solution for the position of the ith document, when that document is a member of the jth cluster, will be $$\hat{x}_i=(C^T S_j C)^{-1} C^T S_j Y_i \qquad [6]$$

The fourth stage can be summarized as:

(i) performing an anchored least stress analysis on cluster centroid coordinates in hyperspace;

(ii) producing a vector for each document with distance measures from the document to each cluster centroid; and (iii) constructing an operator matrix and multiply matrix by each vector in step (ii) to produce two-dimensional coordinates for each document.

STAGE FIVE The output of Stage four (a coordinate pair for each document and cluster centroid) is displayed in a scatter plot yielding what Applicants call the "Galaxies" two-dimensional visualization. For this two-dimensional visualization, no further computation of the Stage Four results is required. A three-dimensional representation of the Stage Four results does require further computation, and results in what Applicant calls a thematic landscape, or "ThemeScapes". This 3D representation provides an intuitive visual measure and a spatial position in display space for dominant topics in a corpus of unstructured documents.

ThemeScapes solves the two most troublesome problems encountered with two-dimensional textual information analysis. That is, important subjects of the database are not easily or accurately discernable—the major topics are imprecisely displayed, if provided at all, and are not spatially organized to support the spatial organization of the 2D document display. Secondly, documents are not readily associated with the main topics which they contain. Similarity between documents is conveyed through proximity, but the relationship between documents and topics are indeterminate. How close a particular document is associated with a topic or how a pair of documents are topically related are difficult or impossible to determine.

First, identification of regional topics, or terms, and the set of documents which contain them must be identified. The gisting features of the text engine will identify the major topics of a corpus of documents. While commercially available text engines provide the gisting feature, such text engines fail to provide a local, spatial representation of the theme, a composite measure of theme, a quantitative measure of theme or document by document measure of theme. A clustering of the n-dimensional document vectors (produced in stage three clustering) will result, and the clusters 10 are projected into 2D space so that each document has an assigned x,y coordinate pair, as illustrated in FIG. 1. For each of these clusters, a set of terms which are both "topical" in nature, as measured by serial clustering, and maximally discriminating between clusters, as measured by the product of the frequency of the term within the documents of a particular cluster and the frequency of the term in all other. The general form of the topic equation is $$\text{term value}_{n,1} = f_{term\ n/cluster\ I} * 1/\Sigma_j\ f_{term\ n/cluster\ j} \qquad [7]$$

with f term n/cluster I=frequency of term n in cluster I

Σf term n/cluster j=frequency of term n in all other clusters and the highest value topics are selected.

The terms derived using this equation are the terms which best discriminate clusters from one another. A number of terms or topics for each cluster are automatically and heuristically selected, with topic value, frequency, cluster size, desired number of terms per cluster and per document collection all considered in the selection process. Each term or topic layer represents the distributed contribution of a single term/topic to the surface elevation of a "theme scape". Topic layer thickness may vary over the area of the simulated landscape based on the probability of finding a specified term within a document at each two dimensional coordinate. After all the individual layers have been computed, a composite layer is derived by summing each of the term layers. A topic layer is thickest where the density of documents that contain that term are highest. In areas where there are few documents or few documents that contain a given term, the topic layer is very thin. High ground on the theme scape represents regions where there is an alignment of terms in underlying documents—or a common theme among proximal documents. Regions that are lower and less pronounced reflect documents that are more general in their content and less focused on a single theme.

Each region or cluster is then characterized by a set of terms or topics. Associated with each topic for each cluster is a document set. The document set is nothing more than the result of a Boolean query with the topic as the keyword. The first stage of ThemeScape construction is complete when both regional topics and their corresponding document sets are identified.

Figure 2:
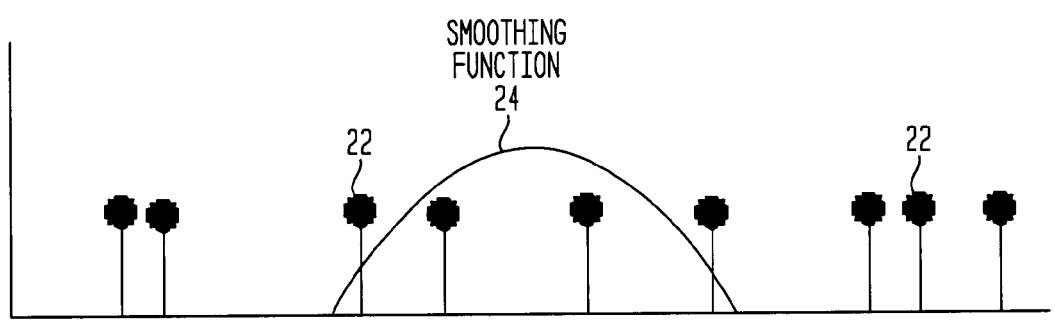
FIG. 2 is a one dimensional representation of documents represented in FIG. 1.
Figure 3:
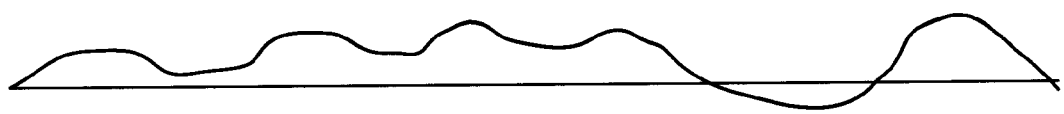
FIG. 3 is a smoothed version of the representation of FIG. 2.

The second stage of ThemeScapes development, formation of the three-dimensional surface for individual topics identified above requires a smoothing filter be run over the x,y coordinates of the document display. This process is analogous to operations such as edge detection or feature enhancement in image processing. As illustrated in FIGS. 2 and 3, individual points 22 along the x-axis indicate the location of a document in the topic's document set. A smoothing function is run across each point creating a z coordinate associated with the term layer for each x,y pair, represented as surface 24 above the x-axis. The equation for calculating the y coordinate corresponding to each x coordinate will be of the form $$y_x = \Sigma_{n-m}^{n+m} d_{x+n} * f(x+n), \qquad [8]$$

with $d_{x-n}=1$ for document present at coordinate x+n, else 0
f(x+n) the value of the smoothing function at $x_n$
2m=width of the smoothing function centered about x.

The two dimensional calculation of a ThemeScape as illustrated in FIG. 3 utilizes a two dimensional grid of documents and a two dimensional smoothing function, producing a third dimension reflecting the probability of finding a document with the given topic in the given vicinity.

Finally, all individual topic ThemeScapes are superpositioned. The individual elevations from each term layer are added together to form a single terrain corresponding to all topics, Thus, $$z_{x,y} = \sum_{j=1}^{\#\ of\ cluster\ terms} \text{term layer } j_{x,y} \qquad [9]$$

Generally, normalization of the above equation is performed.

Figure 4:
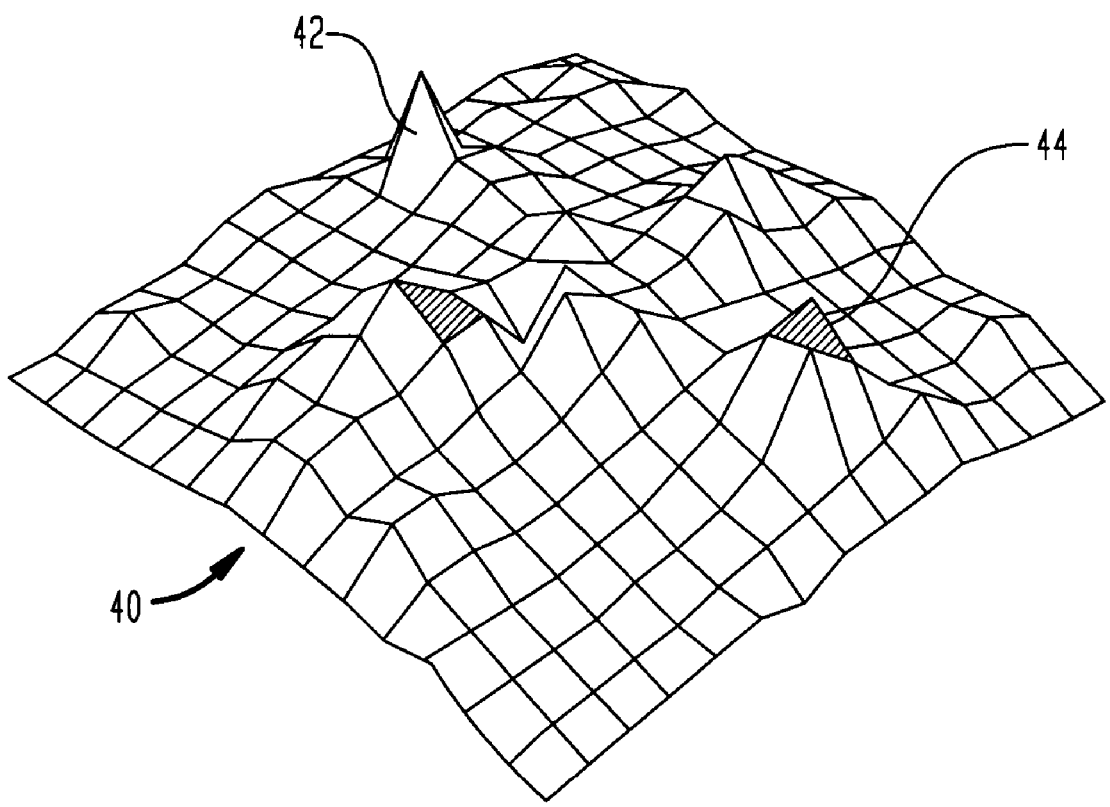
FIG. 4 is a three-dimensional representation of a database having small theme sets and high discrimination.

The result of this computation is a "landscape" that conveys large quantities of relevant information. The terrain simultaneously communicates the primary themes of an arbitrarily large collection of documents and a measure of their relative magnitude. Spatial relationships defined by the landscape reveal the intricate interconnection of themes, the existence of information gaps or negative information. For example, FIG. 4 illustrates a "theme scape" 40 of a database with 200 documents and 50 themes. In this data set, themes had relatively small document sets (a low number of documents contained in each theme), but high theme discrimination values (the documents were clustered close to the theme location). More prominent peaks are characteristic of the high discrimination values, as for example peak 42 representing "nuclear weapons" and peak 44 representing "health physics".

Figure 5:
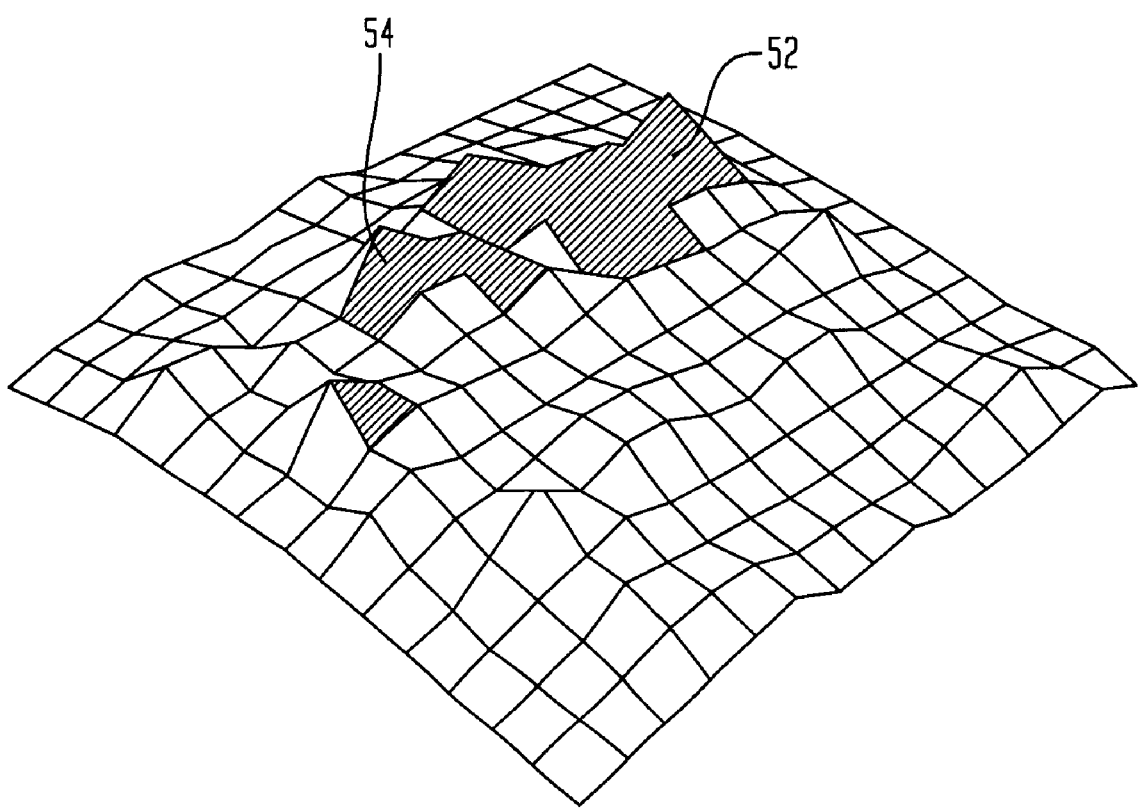
FIG. 5 is a three-dimensional representation of a database having large theme sets and low discrimination.

FIG. 5 represents a database with the same number of documents and themes as in FIG. 4, however the themes have relatively large document sets and low theme discrimination values, as at peak 52 representing "lasers" and peak 54 representing "genetics".

Therefore, the ThemeScape function of the present invention can be summarized as follows:

(i) receive n-dimensional context vector from text engine for each document and cluster documents in n-dimensional space;

(ii) for each such cluster, receive from text engine associated gisting terms or topics;

(iii) creating a list of topics for each cluster;

(iv) creating global keyword list by combining the topics for each cluster and eliminating common terms (such as a, and, but, the);

(v) performing keyword query on topic, producing a list of documents associated with the topic;

(vi) identifying coordinates for all documents associated with the topic, producing a matrix of retrieved documents in the x,y display coordinates;

(vii) applying a smoothing function to each x,y pair, producing a z coordinate associated with the topic for each x,y pair; and (viii) repeating steps (v) and (vi) for each term in the list identified in step (iv).

An embodiment of the present invention is shown in FIG. 6. The embodiment provides a method of determining and displaying the relative content and context of a number of related documents in a large document set. The relationships of a plurality of documents are presented in a three-dimensional landscape with the relative size and height of a peak in the three-dimensional landscape representing the relative significance of the relationship of a topic, or term, and the individual document in the document set. The steps of the process are shown in steps 602 through 614 of FIG. 6, including: (a) constructing an electronic database of a plurality of documents to be analyzed (step 602); (b) creating a plurality of high dimensional vectors, one for each of the plurality of documents, such that each of the high dimensional vectors represents the relative relationship of the individual documents to the term, or topic attribute (step 604); (c) arranging the high dimensional vectors into clusters, with each of the clusters representing a plurality of documents grouped by relative significance of their relationship to a topic attribute (step 606); (d) calculating centroid coordinates as the center of mass of each cluster, the centroid coordinates being stored or projected in a two-dimensional plane (step 608); (e) constructing a vector for each document, with each vector containing the distance from the document to each centroid coordinate in high-dimensional space (step 610); (f) creating a plurality of term (or topic) layers, each of the term layers corresponding to a descriptive term (or topic) applied to each cluster, and identifying x,y coordinates for each document associated with each term layer (step 612); and (g) creating a z coordinate associated with each term layer for each x,y coordinate by applying a smoothing function to the x,y coordinates for each document, and superposing upon one another all of the terms layers (step 614).

It will be apparent to those skilled in the art that various modifications can be made to the methods disclosed herein for producing a three-dimensional representation of a database, without departing from the scope or spirit of the invention, and it is intended that the present invention cover modifications and variations of the methods claimed herein to the extend they come within the scope of the appended claims and their equivalents.

We claim:

1. A method of determining and displaying the relative content and context of a number of documents in a large document set, wherein the relationships of a plurality of documents are presented in a three-dimensional landscape with the relative size and height of a peak in the three-dimensional landscape representing the relative significance of the relationship of a topic attribute and the individual documents in the document set, comprising the steps of:

(a) building an electronic database of a plurality of documents;

(b) creating a plurality of high dimensional vectors, one for each of said plurality of documents such that each of said high dimensional vectors represents the relative relationship of the individual documents to the topic attribute;

(c) arranging said high dimensional vectors into clusters, each of said clusters representing a plurality of documents grouped by the relative significance of their relationship to a topic attribute;

(d) calculating centroid coordinates as the center of mass of each cluster, the centroid coordinates being stored or projected in a two-dimensional plane;

(e) constructing a vector for each document, said vector containing the distance from the document to each centroid coordinate in high-dimensional space;

(f) creating a plurality of term layers, each of said term layers corresponding to a descriptive term applied to each cluster, and identifying x,y coordinates for each document associated with each term layer; and (g) creating a z coordinate associated with each term layer for each x,y coordinate by applying a smoothing function to the x,y coordinates for each document, and superimposing upon one another all of said term layers.

* * * * *